(12) United States Patent
Ziemkowski

(10) Patent No.: US 6,853,805 B2
(45) Date of Patent: Feb. 8, 2005

(54) CAMERA REMOTE SYSTEM AND METHODS ASSOCIATED THEREWITH

(75) Inventor: Theodore B. Ziemkowski, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/443,488

(22) Filed: May 22, 2003

(65) Prior Publication Data

US 2004/0184796 A1 Sep. 23, 2004

Related U.S. Application Data

(63) Continuation of application No. 10/138,695, filed on May 3, 2002, now Pat. No. 6,618,557.

(51) Int. Cl.$^7$ .............................................. G03B 17/00
(52) U.S. Cl. ........................................................ 396/56
(58) Field of Search .................. 396/56–59; 348/211.1, 348/211.2

(56) References Cited

U.S. PATENT DOCUMENTS 4,272,176 A * 6/1981 Maitani et al. ............. 396/221
6,618,557 B1 * 9/2003 Ziemkowski ................ 396/56

* cited by examiner

*Primary Examiner*—W. B. Perkey

(57) ABSTRACT

Disclosed herein are various embodiments of a camera and methods associated therewith for notifying a user upon non-conforming separation of a remote from the camera.

8 Claims, 4 Drawing Sheets

CAMERA REMOTE SYSTEM AND METHODS ASSOCIATED THEREWITH

This is a continuation of application Ser. No. 10/138,695 of Theodore B. Ziemkowski for CAMERA REMOTE SYSTEM AND METHODS ASSOCIATED THEREWITH, filed May 3, 2002, now U.S. Pat. No. 6,518,657, which is hereby incorporated by reference for all that is disclosed therein.

BACKGROUND

Some cameras are provided with a remote for controlling camera functions such as invoking image capture. Image capture invoked via a remote occurs when a button is pressed on the remote.

A camera remote is often compact and therefore vulnerable to misplacement by a user. Such misplacement may result in loss of time while searching for a lost remote. Furthermore, in the event that a misplaced remote is not recovered, replacement may be difficult.

SUMMARY

In one embodiment disclosed herein, A camera remote system for a camera may include: a camera housing; a remote; an alarm located in the camera housing; and a controller located in the camera housing, the controller detecting absence of the remote and activating the alarm.

In another embodiment disclosed herein, a method of notifying a user of a missing remote for a camera may include: providing a remote receptacle formed in the camera; notifying the user of the missing remote upon non-return of the remote to the remote receptacle; terminating the notifying upon replacement of the remote to the remote receptacle.

DETAILED DESCRIPTION

Figure 1:
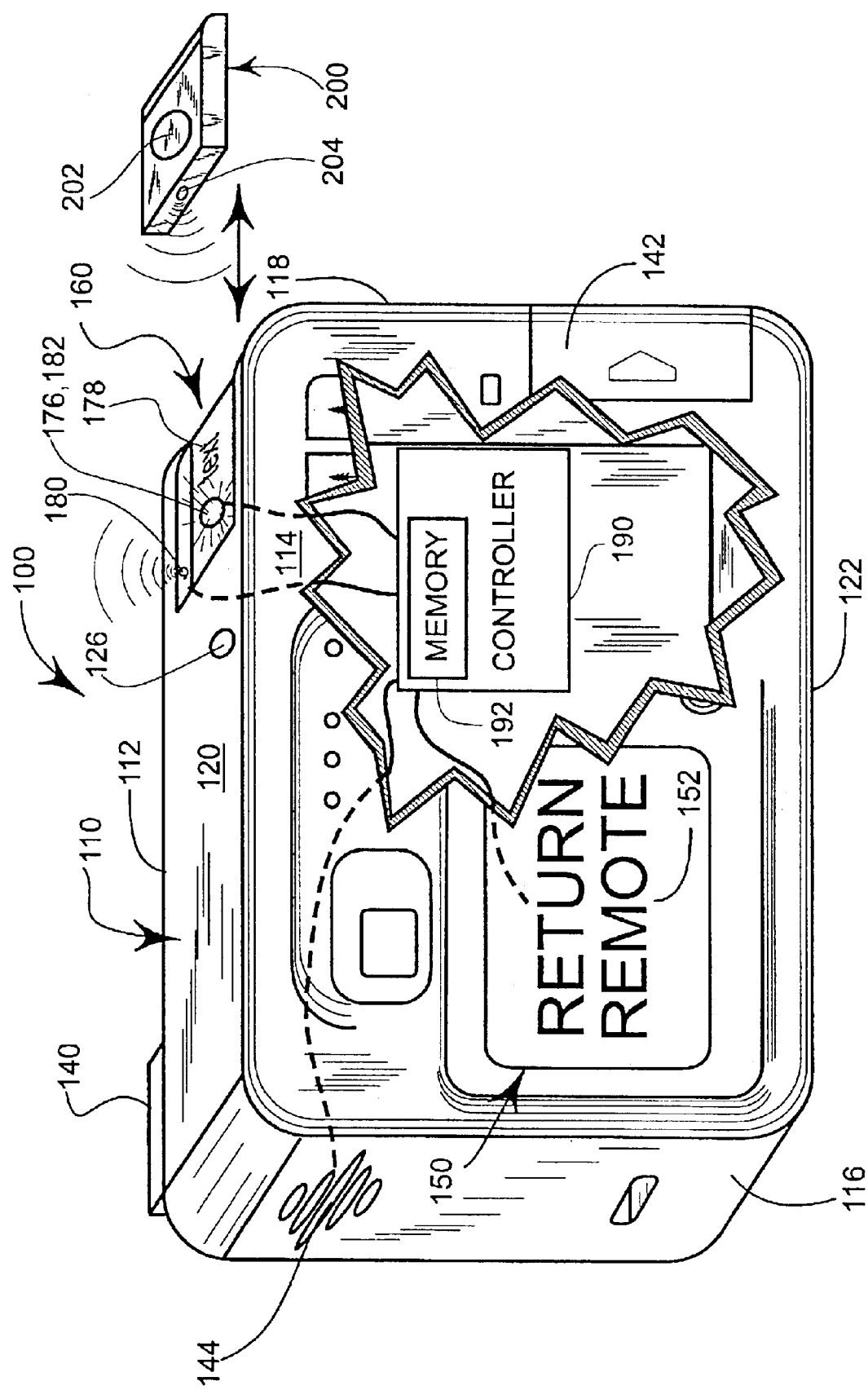
FIG. 1 shows a perspective view of a camera and a remote separated therefrom, including a remote system.

FIG. 1 shows a digital camera 100 having a remote-missing-notification system (also referred to herein as a missing remote system and an alarm) provided therewith. The remote-missing-notification system may be utilized to notify a user upon non-conforming separation of a remote 200 from the camera 100.

With reference to FIG. 1, the camera 100 may be provided with a housing 110. Housing 110 may have a front 112, a back 114, a left side 116, a right side 118, a top 120 and a bottom 122. The camera 100 may be provided with a plurality of user interfaces for operating the camera 100, such as a mode button 124 (FIG. 3) and a power button 126.

The camera 100 may be provided with a lens assembly (not shown), a controller (not shown) and a photosensor array (not shown). The photosensor array may, for example, be one or more two-dimensional arrays. The camera 100 may be further provided with other components such as a flash 140, a power supply (not shown), a storage media interface 142 and a speaker 144.

As an alternative, the camera 100 may be provided with a film-based image capture devices such as a shutter and a film carrier. This alternative camera 100 may be provided with the remote-missing-notification system described herein. Additionally, other imaging devices such as video cameras, either film-based or digital-based may be provided with the present apparatus and methods.

The lens assembly may be mounted to the camera housing front 112 in optical communication with the photosensor array. Light passing through the lens assembly forms an image of an object on the photosensor array. The photosensor array may be utilized in conjunction with the controller in a process to form image data representative of the image of the object formed thereon in a manner well known in the art.

The photosensor array and other components such as the flash 140, the power supply, the storage media interface 142 and the speaker 144 may be placed in electronic communication with the controller by conventional electronic interfaces such as conductor wires, circuit boards, etc. The controller may include a microprocessor of equivalents thereof as those skilled in the art will appreciate.

With continued reference to FIG. 1, the camera 100 may be further provided with a display 150. In one embodiment the digital camera 100 may be provided with a display 150 mounted on the camera back 114. Image data representative of an object imaged by the camera may be displayed on the display 150; furthermore, the display may show information utilized to manipulate various features provided with the camera 100 such as the camera remote-missing-notification system.

As an alternative to mounting the display 150 on the camera back 114, it is to be understood that the display may be mounted on any of the other portions (e.g., 112, 116, 118, 120, 122) of the camera housing 110.

The camera 100 may be further provided with a remote receptacle 160. The remote receptacle 160 may be formed in any location on the camera housing 110 (e.g. back 114, the front 112, the left side 116, the top 120, etc). In one exemplary, non-limiting, embodiment, the remote receptacle 160 is formed on the camera housing top 120. In one exemplary embodiment, the remote 200 may serve as the only interface for invoking capture of image data.

The remote receptacle 160 may be provided with any one of a variety of mechanical interfaces for readily, removably attaching the remote 200 to the camera housing 110. One such exemplary mechanical interface is a rail system.

Figure 2:
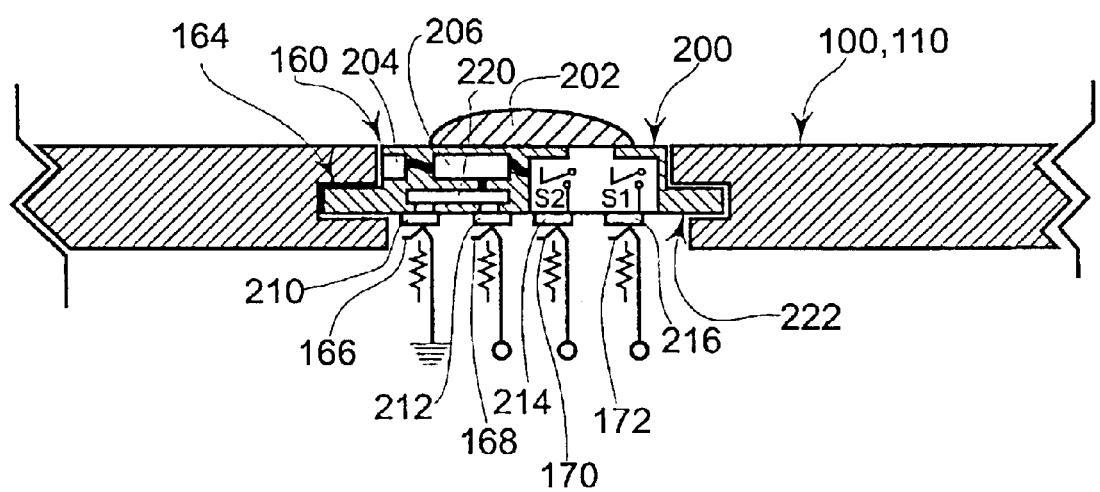
FIG. 2 shows a partial cross-sectional schematic view of a camera and a remote associated therewith taken across plane 2—2 of FIG. 3.

With reference to FIG. 2, in an exemplary, non-limiting, embodiment, the remote receptacle 160 may be provided with a rail system 164.

As an alternative, it is noted that the camera remote receptacle rail system 160 is one exemplary embodiment and other mechanical interfaces have been contemplated such as, for example, tabs, detents, clips, protrusions, bosses, rotary connectors, detents, magnets, hook-and-loop fasteners, or other mechanical devices that those skilled in the art may implement for accomplishing similar results.

The remote receptacle 160 may be provided with electrical interface elements for communicating between the camera 100 and the remote 200. As shown in FIG. 2, the remote receptacle 160 may be provided with a first conductor 166, a second conductor 168, a third conductor 170 and a fourth conductor 172. Although four conductors have been depicted in the drawings and described herein, it is noted that more conductors or fewer conductors may be provided. The remote receptacle conductors 166, 168, 170 and 172 may be biased way from the camera housing 110 as depicted schematically in FIG. 2. This biasing of the conductors ensures electrical contact between the camera 100 and the remote 200 when the remote 200 is inserted into the remote receptacle 160. Furthermore, the conductors may be attached to electronics embedded within the camera housing 110 such as the controller, the power supply, etc. In one exemplary, non-limiting, embodiment the first conductor 166 may be connected to the negative terminal of the power supply (not shown) and therefore be referred to as 'ground'. In this exemplary embodiment, the second conductor 168 may be connected to the positive terminal of the power supply (not shown). Furthermore, the third conductor 170 and the fourth conductor 172 may be connected to the controller for controlling any one of a variety of functions such as image capture.

Figure 3:
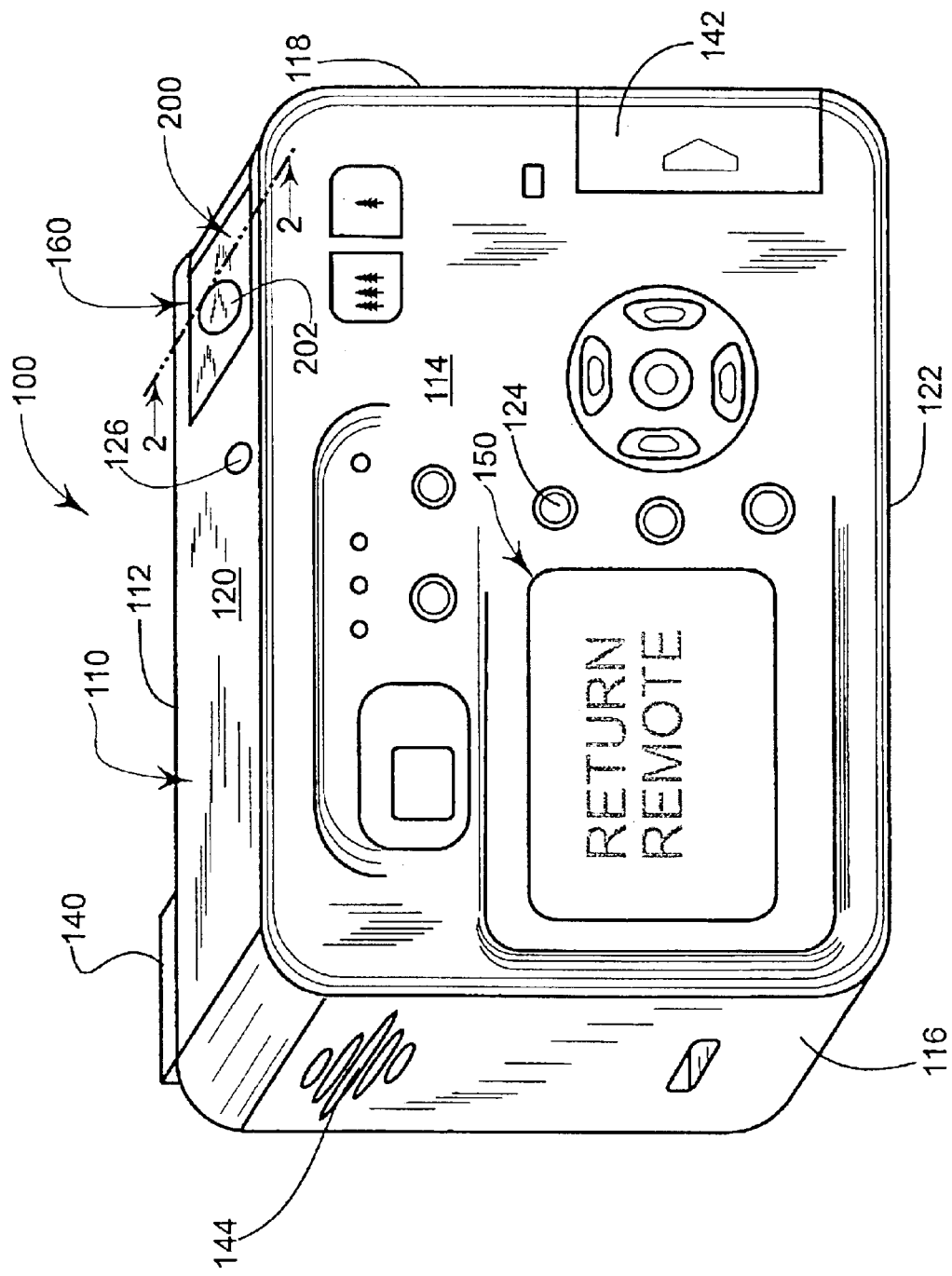
FIG. 3 shows a perspective of the camera of FIG. 1 with a remote removably attached thereto.

With reference to FIG. 1., camera 100 may be provided with a remote-missing-notification device 176 (the remote-missing-notification device 176 may be referred to herein as an alarm device 176). The remote-missing-notification device 176 serves to notify a user of conditions that may result in misplacement of the remote 200. The remote-missing-notification device 176 may be any of a variety of devices such as, for example, a speaker, a light source, a display, a piezoelectric element, a mechanical buzzer, etc. In one exemplary, non-limiting, embodiment the remote-missing-notification device 176 may include a light source such as a light emitting diode 182. In one exemplary, non-limiting, embodiment, when the remote-missing-notification device 176 includes the light emitting diode 182, the light emitting diode 182 may be formed in the remote receptacle 160. When formed in the remote receptacle 160, the light emitting diode 182 is visible when the remote 200 is separated from the camera 100 and the light emitting diode 182 is hidden when the remote 200 is docked (sometimes referred to herein as stowed) with the camera 100 as shown in FIG. 3.

The remote receptacle 160 may be further provided with text 178. The text 178 may notify the user that improper stowage of the remote 200 may result in activation of the remote-missing-notification device 176. Furthermore, the text may also notify the user that the remote 200 is required to operate the camera 100.

With continued reference to FIG. 1, the camera 100 is provided with a camera communication element 180, such as a radio frequency (RF) receiver for communicating with the remote 200. As an alternative, the camera communication element 180 may be any one of a variety of remote communication devices such as an infrared (IR) receiver, or other communication element known to those skilled in the art. It is noted that as represented in FIG. 1, the camera communication element 180 may, or may not, be a visible element depending on the variety of remote communication device utilized. In the case where the camera communication element 180 takes the form of an infrared (IR) receiver, for example, the camera communication element 180 would generally be visible in the view of FIG. 1. This visible presence of the IR-type camera communication element 180 is an inherent property of IR receivers that generally require a window through which light passes. In the case, however, where the camera communication element 180 takes the form of a radio frequency (RF) receiver, for example, the camera communication element 180 would generally be invisible in the view of FIG. 1. This non-visible presence of the RF-type camera communication element 180 is an inherent property of RF receivers that are capable of receiving transmissions through opaque objects such as the camera-housing 110.

With continued reference to FIG. 1, the camera 100 may be provided with a controller 190. The controller 190 may be any type of controller capable of receiving an instruction from at least one input device and acting on receipt of such instruction. The controller 190 may be provided with a microprocessor and associated memory 192. Alternatively, the controller 190 may be a hard-coded device such as an application specific integrated circuit (ASIC). The controller 190 may contain firmware located in memory 192 that may allow for operation of the camera 100, the remote-missing-notification device 176, the remote 200 and/or other devices associated with the camera 100. The controller 190 may be operatively associated with components of the camera 100, such as, for example, the flash 140, the speaker 144, the display 150, the remote receptacle conductors 166, 168, 170 and 172, the remote-missing-notification device 176, the camera communication element 180, or other camera components.

The remote 200 may be provided with a capture button 202, a remote communication element 204 and a controller 206. The capture button 202 serves to notify the camera 100 of the desire to capture image data by-way-of communication through the remote communication element 204, such as through a radio frequency transmitter. The capture button 202 may be any of a variety of selector devices such as a dual-stage button. A dual-stage capture button has elements embedded therein that provide electrical indication of two conditions, commonly referred to as S1 and S2 by those skilled in the art. S1 is commonly used in the operation of cameras to lock focus. S2 is commonly used to invoke image capture. S1 may be invoked by partially depressing the capture button 202, while S2 may be invoked by completely depressing the capture button 202. The controller 206 may be any type of controller capable of receiving instructions from input devices and acting on receipt of such instructions. The controller 206 may be provided with a microprocessor and associated memory 208. Alternatively, the controller 206 may be a hard-coded device such as an application specific integrated circuit (ASIC). The controller 206 may contain firmware located in memory 208 that allows for operation of the remote 200.

As an alternative, the remote communication element 204 may be any one of a variety of remote communication devices such as those previously described with respect to the camera communication element 180. It is noted that, although the remote communication element 204 is shown in FIG. 1 for illustration purposes, the communication element 204 may not actually be visible, depending on the type of communication element used. In the case, however, where the remote communication element 204 takes the form of an infrared (IR) transmitter, for example, the remote communication element 204 would generally be visible in the view of FIG. 1. This visible presence of the IR-type remote communication element 204 is an inherent property of IR transmitters that generally require a window through which light passes. In the case where the remote communication element 204 takes the form of a radio frequency (RF) transmitter, for example, the remote communication element 204 would generally be invisible in the view of FIG. 1. This non-visible presence of the RF-type remote communication element 204 is an inherent property of RF transmitters that are capable of transmitting through opaque objects such as the camera housing 110.

With reference to FIG. 2, the remote 200 may be provided with a fifth conductor 210, a sixth conductor 212, a seventh conductor 214 and an eighth conductor 216. Although four conductors have been depicted in the drawings and described herein, it is noted that more conductors or fewer conductors may be provided with the remote 200. The fifth conductor 210 and the sixth conductor 212 may be electrically coupled to a power storage device 220 such as a battery or a capacitor. The seventh conductor 214 may be electrically attached to the capture button 202 for indicating S1 as previously described. The eighth conductor 216 may be electrically attached to the capture button 202 for indicating S2 as previously described. As shown in FIG. 2, the controller 206 may be electrically interfaced with the power storage device 220, the capture button 202, the communication element 204 and other components incorporated within the remote 200. The controller 206 may be utilized for transmitting a user's actuation of the capture button 202 to the camera via the remote communication element 204 to the camera communication element 180 (FIG. 1).

With further reference to FIG. 2, the remote 200 may be provided with a rail system 222. The remote rail system 222 and the remote receptacle rail system 164 work in conjunction with each other for readily, removably attaching the remote 200 to the camera 100.

As an alternative to the remote rail system 222, it is noted that other mechanical interfaces have been contemplated such as those previously described with respect to the camera remote receptacle rail system 160.

The camera 100 may be provided with an awake mode and a sleep mode. As used herein, the awake mode may be defined as a camera mode in which the camera is essentially activated. In this exemplary awake mode, the camera 100 may be capable of providing typical camera functions such as capturing image data. As used herein, the sleep mode may be defined as a camera mode in which the camera is essentially inactive. In this exemplary sleep mode, the camera 100 may not be able to perform typical camera functions such as capturing image data.

Having described an exemplary embodiment of the camera 100 having a remote 200, the utilization thereof will now be described.

With reference to FIG. 3, a non-remote operating mode for the camera 100 is shown in which the remote 200 is docked in the camera remote receptacle 160. While docked in the remote receptacle 160, the remote 200 may be in communication with the camera 100 via the remote conductors 210, 212, 214 and 216 which are in electrical contact with the camera conductors 166, 168, 170 and 172. Such communication between the remote 200 and the camera 100 may be monitored and/or processed by the controller 190. In one embodiment, the communication elements 180 and 204 (FIG. 1) are not utilized for invoking camera functions while the remote 200 is docked in the camera remote receptacle 160; instead, the conductors are utilized for invoking camera functions. Such utilization of the conductors may result in reduced power consumption when compared to utilization of the communication elements 180 and 204.

With reference to FIG. 2, while the remote 200 is docked, the power storage device 220 (FIG. 2) may be charged through the first and second conductors 166, 168 and the fifth and sixth conductors 210, 212 (conductors 166, 168, 210 and 212 are shown in FIG. 2). Such charging of the power storage device 220 may continue until the power storage device 220 is fully charged (this condition may be monitored by the remote controller 206.

When the user desires to invoke image capture while operating in the non-remote operating mode, he/she may actuate the capture button 202. In one exemplary embodiment, actuation of the capture button 202 includes depressing the capture button 202 which first closes S1 and then closes S2. The indication to the camera 100 of to the closing of S1 may occur through the fourth and eighth conductors 172, 216. The indication to the camera 100 of the closing of S2 may occur through the third and seventh conductors 170, 214. Indication to the camera 100 of closing of either S1 or S2 may occur through the remote controller 206 and/or the camera controller 190.

When operating in a remote operating mode, various functions of the camera 100 may be invoked through the remote 200. One such camera function invoked through the remote 200 is image capture. As shown in FIG. 1, the remote 200 may be at a distance from the camera 100. Camera functions invoked through the remote 200 may be transmitted to the camera 200 via the communication elements 180, 204. The transmission of a user's intent to invoke a camera function may be processed by the remote controller 206. Reception and activation of camera functions may be processed by the camera controller 190.

The remote operating mode may lead to misplacement, theft or loss of the remote 200 since the remote 200 is not physically attached to the camera 100. The present disclosure addresses this propensity for misplacement, theft or loss through notification to the user that the remote 200 is not located in the remote receptacle 160 upon a determination that such non-docking does not conform with typical camera usage. An exemplary process of notification of the remote-missing-notification system (also referred to herein as an alarm, or a remote-alarm) is shown schematically in FIG. 4. The remote-missing-notification system 300 may exist as an algorithm located within the memory 192.

Figure 4:
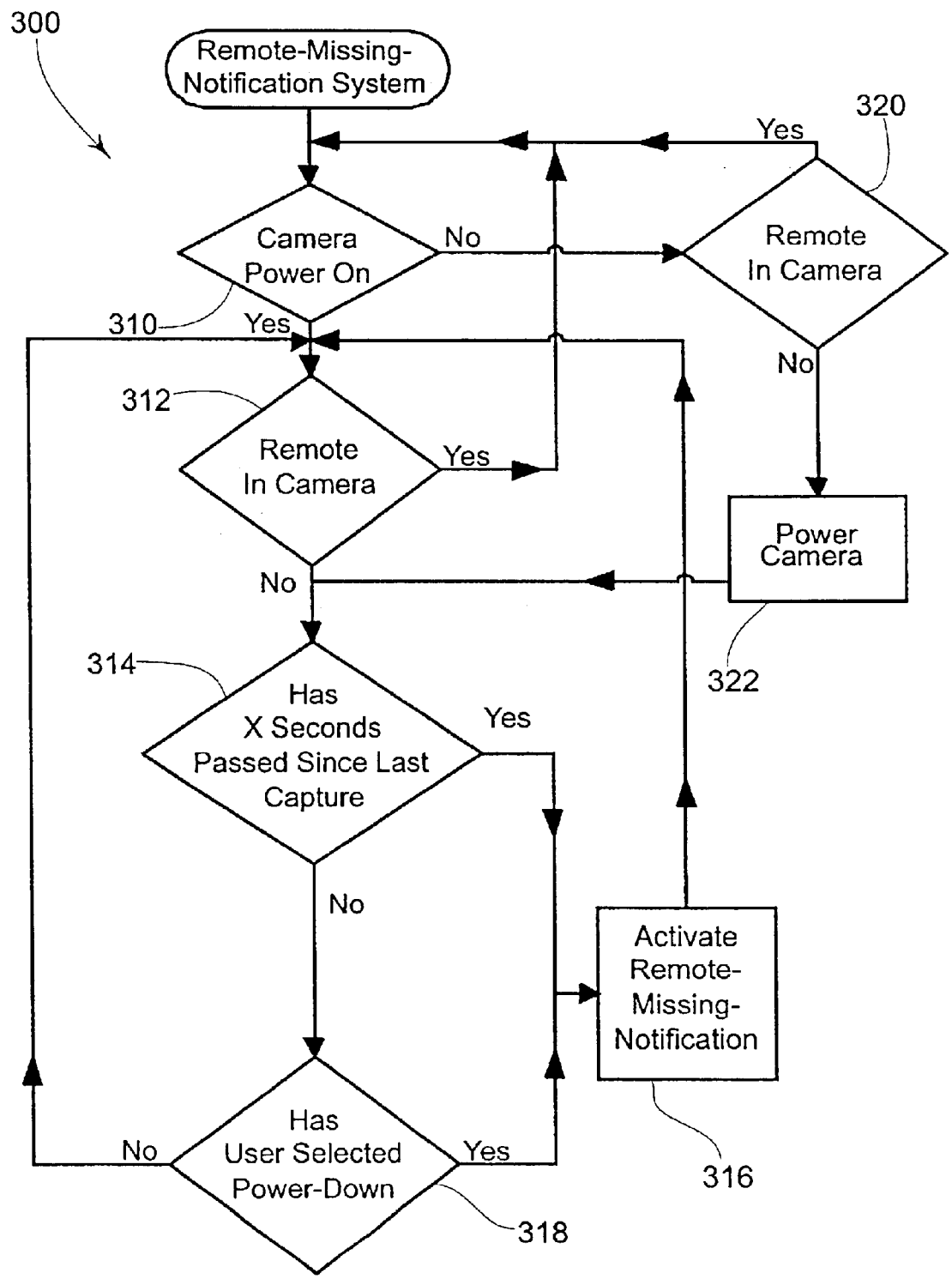
FIG. 4 shows a block diagram of a remote-missing-notification system.

With reference to FIG. 4, the remote-missing-notification system 300 may include a determination 310 if the camera is powered. In the event that the camera 100 is on, then the outcome of the "camera power on" determination 310 will be positive and a "remote in camera" determination 312 may be conducted. The presence of the remote 200 in the camera remote receptacle 160 may be determined in any one of a number of ways such as monitoring current flow to the power storage device 220, a microswitch formed in the remote receptacle 160, a proximeter, a photodetector or other devices now known to those skilled in the art or that are later developed. In the event that the remote 200 is not in the camera remote receptacle 160, the outcome of the "remote in camera" determination 312 will be negative. In the event that the "remote in camera" determination 312 is negative, a determination 314 if "X seconds has passed since last capture" may be conducted. The period of time 'X' may be any period of time after which the remote 200 may be misplaced, and may, for example, be a few seconds to several minutes or more. In one exemplary, non-limiting, embodiment, X is about 2 minutes. In the event that X period of time (e.g. 2 minutes) has passed since the user has captured an image, the outcome of the "has X seconds passed since last capture" determination 314 will be positive. With a positive outcome of the "has X seconds passed since last capture" determination 314, an "activate remote-missing-notification" process 316 may be initiated. It is noted that the previously described determinations and actions may be directed and/or completed by the camera controller 190.

During the "activate remote-missing-notification" process 316, the user is requested to either use the remote 200 or return it to the remote receptacle 160. Such notification may include any one or a plurality of actions that notify the user of the missing remote 200. Such notification may include activation of the remote-missing-notification device 176 such as powering a light source, activating the speaker 144, showing a message 152 on the display 150, etc. In one particular example, the remote-missing-notification device 176 may include flashing a light emitting diode 182, playing a recorded message on the speaker 144 and showing the message 152 (e.g. "Return Remote") on the display 150 (as shown in FIG. 1).

The activate remote-missing-notification 316 process may continue until at least one of the following occurs: a) a predetermined period of time has passed, b) until the remote is returned to the camera remote receptacle 160, or c) until the remote 200 is used (e.g. to invoke image capture). Occurrence of one of these activities that terminates process 316 may be monitored by the camera controller 190. In one exemplary embodiment, the activate remote-missing-notification process 316 may continue until the remote 200 is returned to the camera remote receptacle 160. This return of the remote 200 to the camera remote receptacle 160 may be monitored by the "remote in camera" determination 312.

Referring back to the has "X seconds passed since last capture" determination 314, if less then X seconds has passed, the outcome of the determination 314 will be negative. With a negative outcome for the "has X seconds passed since last capture" determination 314, a "has user selected power-down" determination 318 may be initiated. Powering-down a camera may be referred to herein as 'sleeping' whereby the camera is substantial dormant. If the user has actuated power-down, and the remote 200 is not located in the camera remote receptacle 160, the "activate remote-missing-notification" process 316 may commence. In the event that the user has not selected power-down, determination 318 will be negative and the "remote in camera" determination 312 is revisited.

Referring back to the camera power on determination 310, if the camera is off, the outcome for determination 310 will be negative. With a negative outcome for the "camera power on" determination 310, a "remote in camera" determination 320 may be provided. If the remote 200 is in the camera remote receptacle 160, the outcome of the "remote in camera" determination 320 will be positive and the "camera power on" determination 310 may be revisited. In the event that remote 200 has been removed from the camera remote receptacle 160 while the camera 100 is off, the outcome of the "remote in camera" determination 320 will be negative. With a negative outcome of the "remote in camera" determination 320, a "power camera" process 322 (also referred to herein as 'waking' the camera) may commence. After turning the camera 100 on during the "power camera" process 322, the "has X seconds passed since last capture" determination 314 may be revisited.

It is noted that the preceding description contains one exemplary remote-missing-notification system 300. It is further noted that other systems may be implemented as those skilled in the art will appreciate upon reading the present disclosure to yield similar the similar result of notifying a user of non-conforming docking of a remote in a camera.

In an alternative embodiment, the camera 100 may be provided with the remote-missing-notification system 300 as a user-selected option. This user-selected option may activate or deactivate the remote-missing-notification system 300 as desired. In some situations, the user may desire to have the remote 200 separated from the camera 100 for a long period of time prior to capturing an image. In this exemplary embodiment, the user may deactivate the remote-missing-notification system 300 through the mode button 124 (FIG. 3) or other conventional user inputs.

As previously mentioned, there are different types of imaging apparatus for capturing image data of objects. These different types of imaging apparatus include film-type and digital-type systems. It is noted that the preceding description directed towards a digital-type camera having a photosensor array may be implemented in other types of imaging apparatus such as, for example, digital video cameras, film video cameras, film still cameras, etc.

While embodiments of the invention have been described in detail herein, it is to be understood that the inventive concepts may be otherwise variously embodied and employed and that the appended claims are intended to be construed to include such variations except insofar as limited by the prior art.

I claim:

1. A camera remote system for a camera comprising:

a camera housing;

a remote;

an alarm located in said camera housing; and a controller located in said camera housing, said controller detecting absence of said remote and activating said alarm;

wherein, said alarm comprises an audible device;

a remote receptacle formed in said camera housing; and a text message formed on said camera housing remote receptacle.

2. The camera remote system of claim 1 and further:

wherein at least one component of said alarm is formed in said remote receptacle.

3. The camera remote system of claim 1 and further comprising:

at least one conductor formed on said remote, said conductor being electrically associated with said alarm.

4. A method of notifying a user of a missing remote for a camera comprising:

providing a remote receptacle formed in said camera;

providing an alarm located in said camera housing with at least one component of said alarm formed in said remote receptacle;

using said alarm to notify said user of said missing remote upon non-return of said remote to said remote receptacle;

terminating said notifying upon replacement of said remote to said remote receptacle.

5. The method of claim 4 and further comprising:

waiting a predetermined period of time prior to said notifying said user of said missing remote.

6. A camera remote system for a camera comprising:

a camera housing;

a remote;

an alarm located in said camera housing; and a controller located in said camera housing, said controller detecting absence of said remote and activating said alarm;

a receptacle formed in said camera housing; and wherein at least one component of said alarm is formed in said receptacle.

7. The camera remote system of claim 6 and further comprising;

at least one conductor formed on said remote, said conductor being electrically associated with said alarm.

8. The camera remote system of claim 6 and further comprising:

a text message formed on said receptacle.

* * * * *

UNITED STATES PATENT AND TRADEMARK OFFICE
CERTIFICATE OF CORRECTION

PATENT NO. : 6,853,805 B2
APPLICATION NO. : 10/443488
DATED : February 8, 2005
INVENTOR(S) : Theodore B. Ziemkowski It is certified that error appears in the above-identified patent and that said Letters Patent is hereby corrected as shown below:

IN THE SPECIFICATION

Column 1, line 7, delete Pat. No. "6,518,657" and insert therefor --6,618,557--

Column 1, line 23, delete "A camera" and insert therefor --a camera--

Column 2, line 4, before "film-based" delete "a"

Signed and Sealed this

Twentieth Day of May, 2008

JON W. DUDAS
*Director of the United States Patent and Trademark Office*